(12) United States Patent
Drebinger

(10) Patent No.: US 9,608,769 B2
(45) Date of Patent: Mar. 28, 2017

(54) DATA PACKET FOR BIDIRECTIONAL TRANSMISSION OF DATA PACKETS DURING DATA TRANSMISSION BETWEEN A FIRST AND A SECOND COMMUNICATION APPLIANCE, AND METHOD FOR TRANSMITTING SUCH A DATA PACKET

(71) Applicant: SIEMENS AKTIENGESELLSCHAFT, München (DE)

(72) Inventor: Andreas Drebinger, Herzogenaurach (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/410,246

(22) PCT Filed: Jun. 26, 2013

(86) PCT No.: PCT/EP2013/063353
§ 371 (c)(1),
(2) Date: Dec. 22, 2014

(87) PCT Pub. No.: WO2014/001376
PCT Pub. Date: Jan. 3, 2014

(65) Prior Publication Data
US 2015/0341145 A1  Nov. 26, 2015

(30) Foreign Application Priority Data

Jun. 26, 2012 (DE) .................. 10 2012 210 816

(51) Int. Cl.
*H04L 1/00* (2006.01)
*H04L 5/14* (2006.01)
(Continued)

(52) U.S. Cl.
CPC ............ *H04L 1/008* (2013.01); *H04L 1/1614* (2013.01); *H04L 1/1664* (2013.01); *H04L 1/18* (2013.01); *H04L 5/14* (2013.01)

(58) Field of Classification Search
CPC ..... H04L 1/008; H04L 1/1614; H04L 1/1664; H04L 1/18; H04L 5/14
(Continued)

(56) References Cited

U.S. PATENT DOCUMENTS 6,615,383 B1  9/2003  Khalidi
7,792,594 B2  9/2010  Kleyer
(Continued)

FOREIGN PATENT DOCUMENTS

DE  19924922 A1  12/1999
EP  1780926 A1  5/2007
(Continued)

OTHER PUBLICATIONS

International Search Report; PCT/EP2013/063353; International Filing Date: Jun. 26, 2013; 3 pgs.

*Primary Examiner* — Stephen J Clawson
(74) *Attorney, Agent, or Firm* — Schmeiser Olsen & Watts LLP

(57) ABSTRACT

A data packet for bidirectional transmission of data packets in the case of data transmission between a first and a second communication device and a method for transmitting such a data packet is provided. A data packet that is transmitted from a first to a second communication device to contain a piece of acknowledgement information for all data packets that have already been received from the first communication device previously during this data transmission.

5 Claims, 4 Drawing Sheets

(51) Int. Cl.
*H04L 1/16* (2006.01)
*H04L 1/18* (2006.01)

(58) Field of Classification Search
USPC .......................................................... 370/294
See application file for complete search history.

(56) References Cited

U.S. PATENT DOCUMENTS

| | | |
|---|---|---|
| 8,578,230 B2 | 11/2013 | Nanda |
| 2003/0103521 A1* | 6/2003 | Raphaeli ................ H04B 3/542 370/445 |
| 2003/0110409 A1* | 6/2003 | Gale ........................ H04L 45/02 714/4.11 |
| 2004/0141489 A1* | 7/2004 | Benveniste ........... H04L 1/1664 370/345 |
| 2004/0190455 A1* | 9/2004 | Hashimoto ........... H04L 12/437 370/238 |
| 2005/0210317 A1 | 9/2005 | Brenes |
| 2005/0265332 A1* | 12/2005 | Lim .................... H04L 12/6418 370/389 |
| 2006/0107166 A1* | 5/2006 | Nanda .................. H04B 7/0417 714/748 |
| 2006/0224769 A1 | 10/2006 | Moonen |
| 2010/0106588 A1 | 4/2010 | Dix |
| 2010/0146354 A1 | 6/2010 | Ma |
| 2010/0205499 A1 | 8/2010 | Ahl |

FOREIGN PATENT DOCUMENTS

| | | |
|---|---|---|
| EP | 1743225 B1 | 2/2009 |
| WO | WO 2004084498 A1 | 9/2004 |
| WO | WO 2006041891 A2 | 4/2006 |

* cited by examiner though standard communication protocols of this type at user level adopt control of transport, for example, by

DATA PACKET FOR BIDIRECTIONAL TRANSMISSION OF DATA PACKETS DURING DATA TRANSMISSION BETWEEN A FIRST AND A SECOND COMMUNICATION APPLIANCE, AND METHOD FOR TRANSMITTING SUCH A DATA PACKET

CROSS-REFERENCE TO RELATED APPLICATIONS

This application claims priority to PCT Application No. PCT/EP2013/063353 having a filing date of Jun. 26, 2013, based off of DE102012210816.5 having a filing date of Jun. 26, 2012, the entire contents of which are hereby incorporated by reference.

FIELD OF TECHNOLOGY

The following relates to a data packet for bidirectional transmission of data packets, particularly in the case of a master/reserve configuration in an automation system, and to a method for transmitting such a data packet.

BACKGROUND

EP 1 743 225 B1 discloses a master/reserve (standby) configuration for an automation system for controlling a technical process, such as the production of energy.

In this case, a master system (master) is connected by means of a fast physical communication link, an Ethernet, to a standby or reserve system (reserve) (redundant master/reserve configuration), with the fast communication link being used to bidirectionally interchange data—typically in the form of data packets on the basis of a standardized transmission protocol and typically once per automation cycle—between the master and the reserve.

A redundant master/reserve system of this type with time-critical tasks, as in the case of the automation system here, requires, particularly in the case of the automation system, specifically for the energy production process, an efficient, reliable, controllable or controlled and deterministic communication mechanism for the bidirectional interchange of data between the master and the reserve.

In this context, essential demands on the data interchange are, in detail:
a) reliable, controlled or controllable and robust operation with deterministic transmission times,
b) bidirectional data interchange (full duplex),
c) short or reduced transfer times,
e) efficient use of existent resources, such as computation time and the like, and communication bandwidth,
f) support for point-to-point connections,
g) use of standardized transmission protocols, e.g. Ethernet.

It is also known practice to implement data interchange between communication subscribers/appliances in a networked system on the basis of TCP/IP or similar communication protocols in accordance with layer 4 or above based on an OSI layer or OSI reference model.

Although standard communication protocols of this type at user level adopt control of transport, for example, by means of constant interchange of appropriate control messages such as acknowledgement messages, in the system, they have a complex and elaborate protocol stack and are not deterministic.

Furthermore, data interchange proceeding on the basis of these mechanisms requires long transmission or transfer times, and in this case a total transfer time for bidirectional data interchange between two communication subscribers is obtained by adding up the transfer times for both directions between the communication subscribers.

Although various realtime expansions for the data transmission address deterministic transmission times, in this case too, the total transfer time is obtained by adding up the transfer times for the two directions between the communication subscribers. Real time expansions also necessitate a relatively high level of management expenditure in the system, have repercussions on the system and thus also make no kind of improvements in terms of transfer time and efficiency.

SUMMARY

An aspect relates to improving bidirectional data transmission between communication subscribers/appliances, particularly in a redundant system with time-critical tasks, as in the case of a master/reserve configuration in an automation system.

Another aspect relates to a data packet for bidirectional transmission of data packets during data transmission between a first and a second communication appliance or communication subscriber and by a method for transmitting a data packet during bidirectional transmission of data packets during data transmission between a first and a second communication appliance or communication subscriber having the features according to the respective independent patent claim.

The embodiments of the invention provides that a data packet transmitted from a first to a second communication appliance contains a piece of acknowledgement information relating to all data packets already previously received by the first communication appliance during said data transmission.

The embodiments of the invention also provides that a data packet to be transmitted from a first to a second communication appliance is formed that contains a piece of acknowledgement information relating to all data packets already previously received by the first communication appliance during said data transmission. The data packet formed in this manner is then transmitted from the first communication appliance to the second communication appliance.

In simple terms, the embodiments of the invention provides for a data packet that is to be transmitted—during bidirectional data transmission in the course of defined or stipulated data transmission or (data) transfer between two communication subscribers—from one communication partner to the other communication subscriber—to additionally contain—besides useful data that are to be transmitted—an acknowledgement status for all, or a piece of acknowledgement information about all, already received data packets—sent from the other communication partner to the communication subscriber in the course of said defined transfer.

In other words, the embodiments of the invention provides for simultaneous transfer of useful data and acknowledgement data—in the data packet according to embodiments of the invention—bidirectionally between two communication subscribers, wherein the acknowledgement data contain an acknowledgement status for all already received data packets—sent from one communication partner to the other communication subscriber in the course of a stipulated, defined transfer.

In this case, a piece of acknowledgement information for a data packet already received by a communication appliance/subscriber is intended to be understood in embodiments of the invention to mean that such a piece of information denotes—explicitly for said specific data packet—that said specific data packet has been received properly from the communication appliance/subscriber that is intended to be received.

Expediently, an explicit identifier or piece of acknowledgement information of this type, also just "packet acknowledgement" for short, is provided for an already received data packet in coded form, for example by one bit (per data packet). The binary digit "0" of the bit may thus represent "not received (properly)"/"not acknowledged", for example, or denote such a data packet, whereas the binary digit "1" of the bit may then represent "received"/"acknowledged" or may denote such a data packet.

It is particularly expedient for the piece of acknowledgement information for all already received data packets to be produced in the form of a bit string, with the respective implicit bit index of the bit string corresponding to the associated data packet number.

As a result, i.e. as a result of the simultaneous transfer, according to embodiments of the invention, of useful data and acknowledgement data according to embodiments of the invention or as a result of the piece of acknowledgement information, provided according to embodiments the invention, in the data packet, embodiments of the invention allow a (data) transfer between two communication subscribers, for example in an automation cycle in the case of a redundant master/reserve configuration in an automation system, to no longer require separate acknowledgement messages relating to received data or about received data packets.

Fewer data packets, i.e. a reduced number of data packets—owing to the dispensing with separate acknowledgement messages that can be achieved according to embodiments of the invention—, transmitted between the communication subscribers in turn allow shorter transfer times during bidirectional data interchange.

On account of the separate acknowledgement messages no longer being required and owing to the short transfer times that are possible as a result, embodiments of the invention thus leads to optimized, efficient and effective data interchange between communication subscribers.

Owing to the acknowledgement information—which reflects the current transmission status of the data transfer between the communication subscribers—, embodiments of the invention also achieves a high level of currentness of the transfer data or in the case of the data transfer. Thus, embodiments of the invention easily allows any communication subscriber to find out how many and which data packets have already been received in both (communication) directions at any time.

Embodiments of the invention can also be implemented easily and/or with little expenditure since data packets usually provide a standardized design or structure that can be expanded by the acknowledgement information according to embodiments of the invention. This means that it is then also possible to implement standard packet structures that can be used for standardized communication services, such as OSI or TCP/IP.

In other words, embodiments of the invention are easily and efficiently suited to being based on a standard communication service that is subordinate to embodiments of the invention, for example on communication in accordance with a layer 2 (data link layer) from OSI layers or of an OSI reference model, or to thus using standardized transmission protocols, such as Ethernet, as subordinate communication service.

In this case, said subordinate communication service can provide a logical connection between the communication appliances and the data packets, including elementary error recognition or an elementary error correction mechanism (e.g. cyclic redundancy check CRC), and can undertake the physical addressing of the data packets. All tasks beyond this, such as acknowledgement, packet repetition, error recognition, redundancy management, etc., can be undertaken or provided by embodiments of the invention.

Embodiments of the invention thus allow:
a) reliable and robust operation with deterministic transmission times during data interchange between communication subscribers,
b) bidirectional data interchange (full duplex),
c) reduction of the transfer times (as a result of it being possible to dispense with acknowledgement messages),
d) support for redundant communication links to increase the availability and bandwidth,
e) efficient use of the existent resources and communication bandwidth as a result of minimization of the protocol management data and parallelization of the data transmission,
f) support for point-to-point connections,
g) use of standardized transmission protocols (e.g. Ethernet) as superordinate communication service.

Preferred developments of the embodiments of the invention can also be found in the dependent claims.

The developments described relate both to the data packet and to the method. Embodiments of the invention and/or the developments described can—at least to some extent, as well as altogether—be implemented both in software and in hardware, for example using a specific electrical circuit.

In addition, implementation of the embodiments of the invention and/or of a development described is—at least to some extent, as well as altogether—possible as a result of a computer-readable storage medium that stores a computer program that implements embodiments of the invention or the development.

It is also possible for embodiments of the invention and/or the developments described—at least to some extent, as well as altogether—to be implemented by a computer program product that has a storage medium that stores a computer program that implements embodiments of the invention and/or the developments.

According to one preferred development, there is provision for the piece of acknowledgement information, also just "packet acknowledgement" for short, to be implemented for an already received data packet in coded form, for example by one bit (per data packet).

The binary digit "0" of the bit may thus represent "not received (properly)"/"not acknowledged", for example, or denote such a data packet, whereas the binary digit "1" of the bit may then represent "received"/"acknowledged" or may denote such a data packet.

It is particularly expedient for the piece of acknowledgement information for all already received data packets to be produced in the form of a bit string, wherein each bit in the bit string codes an acknowledgement status relating to a data packet. The respective implicit bit index of a bit in the bit string corresponds in this case to the associated data packet number of the associated data packet that is to be acknowledged.

According to a further preferred development, embodiments of the invention are used during bidirectional data transfer of—a plurality of, for example of two, three, five, ten, fifteen or twenty, or particularly a multiplicity of, for example of one hundred, several hundred or else one thousand or thousands, inventive—data packets between two communication subscribers that are connected to one another by means of, particularly two, three or else more, redundant (physical) communication links. Embodiments of the invention can thus be used to transmit user/useful data bidirectionally between the communication subscribers—by means of the plurality or particularly the multiplicity of inventive data packets.

Thus, embodiments of the invention are particularly suitable for a redundant master/reserve configuration in an automation system having particularly two redundant physical communication links between the master system and the reserve system.

The automation system can be used for process control in the case of processes for goods manufacture or for energy production, for example in power stations.

According to a further preferred development, provision may also be made for the data packet to have a reception counter that indicates how many data packets have already been received by a communication appliance.

It is particularly advantageous if—when there are a plurality of redundant physical communication links between two communication subscribers/appliances or a first and a second communication subscriber—one reception counter per physical communication link is provided in the data packet. A respective reception counter of this type then indicates how many data packets have already been received by a communication appliance via the respective physical communication link.

In other words, in this case, i.e. in the case of redundant physical communication links between two communication subscribers/appliances, provision may also be made for the data packet—formed by a communication subscriber—to have a reception counter per physical communication link between the first and the second communication subscriber or appliance that respectively indicates how many data packets have already been received by the communication subscriber or appliance via the respective physical communication link (sent from the other communication subscriber).

In a simplified and clear illustration, such a reception counter per physical communication link in a data packet formed by a communication subscriber is increased upon reception of a data packet via said communication link by said receiving communication subscriber and transferred (back) to the other communication subscriber. Thus, said other communication subscriber is informed about which communication link has already been used to receive data packets (and how many).

According to another preferred development, provision is made for the data packet to be transmitted between the communication appliances/subscribers on the basis of a communication service that provides interchange of data packets having a fixed length, particularly on the basis of subordinate communication in accordance with a layer 2 of an OSI reference model. In simple terms, in this case embodiments of the invention use the services provided by said subordinate communication service, such as the setup of the logical connection, elementary error recognition and elementary error correction and also physical addressing of data packets, whereas all tasks beyond these, such as particularly acknowledgement, but also packet repetition, error recognition and redundancy management, are performed by embodiments of the invention.

Thus, according to one preferred development, provision may also be made for the data packet to be transmitted on the basis of a standardized transmission protocol, particularly on the basis of an Ethernet protocol.

In addition, according to one preferred development, provision may also be made for embodiments of the invention to be used both for initial sending of data packets according to embodiments of the invention and for repeat sending of unacknowledged, initially sent data packets.

In particular, it is possible—when there are a plurality of physical communication links between the first and the second communication appliance—for the unacknowledged data packet to be resent using a different physical communication link than for the initial sending.

Particularly preferably, provision may be made in this case for an unacknowledged data packet to be resent only when all data packets have previously been sent a first time. In simple terms, the repeat sending(s) begin(s) only after conclusion of the initial sending of all data packets.

In one development, provision may also preferably be made that when all data packets from the data transmission have been received by the communication appliances, i.e. all data packets have been acknowledged, a final data packet is sent from the first to the second communication appliance.

This final data packet is preferably—where there are a plurality of communication links connecting the first to the second communication appliance—sent using all of these plurality of communication links.

According to a further preferred development, provision is made for the data packet to be formed by a communication appliance only when a data packet sent from the other communication appliance to the communication appliance, particularly a first sent data packet, has arrived therein. In particular, provision may be made in this case for the data packet to be formed by a passive communication appliance only when a data packet sent from an active communication appliance to the passive communication appliance, particularly a first sent data packet, has arrived therein. This increases the currentness of the data sent from the passive to the active communication subscriber.

The hitherto provided description of advantageous refinements of embodiments of the invention contains numerous features that are reproduced in the individual subclaims, in some cases several collectively. However, a person skilled in the art will also consider these features individually and pool them into useful further combinations.

BRIEF DESCRIPTION

Some of the embodiments will be described in detail, with reference to the following figures, wherein like designations denote like members, wherein.

DETAILED DESCRIPTION

Exemplary embodiment: bidirectional communication method 60 in the case of a master/reserve configuration 61 for a redundant master/reserve system 3, 4 in an automation system 62

Figure 1:
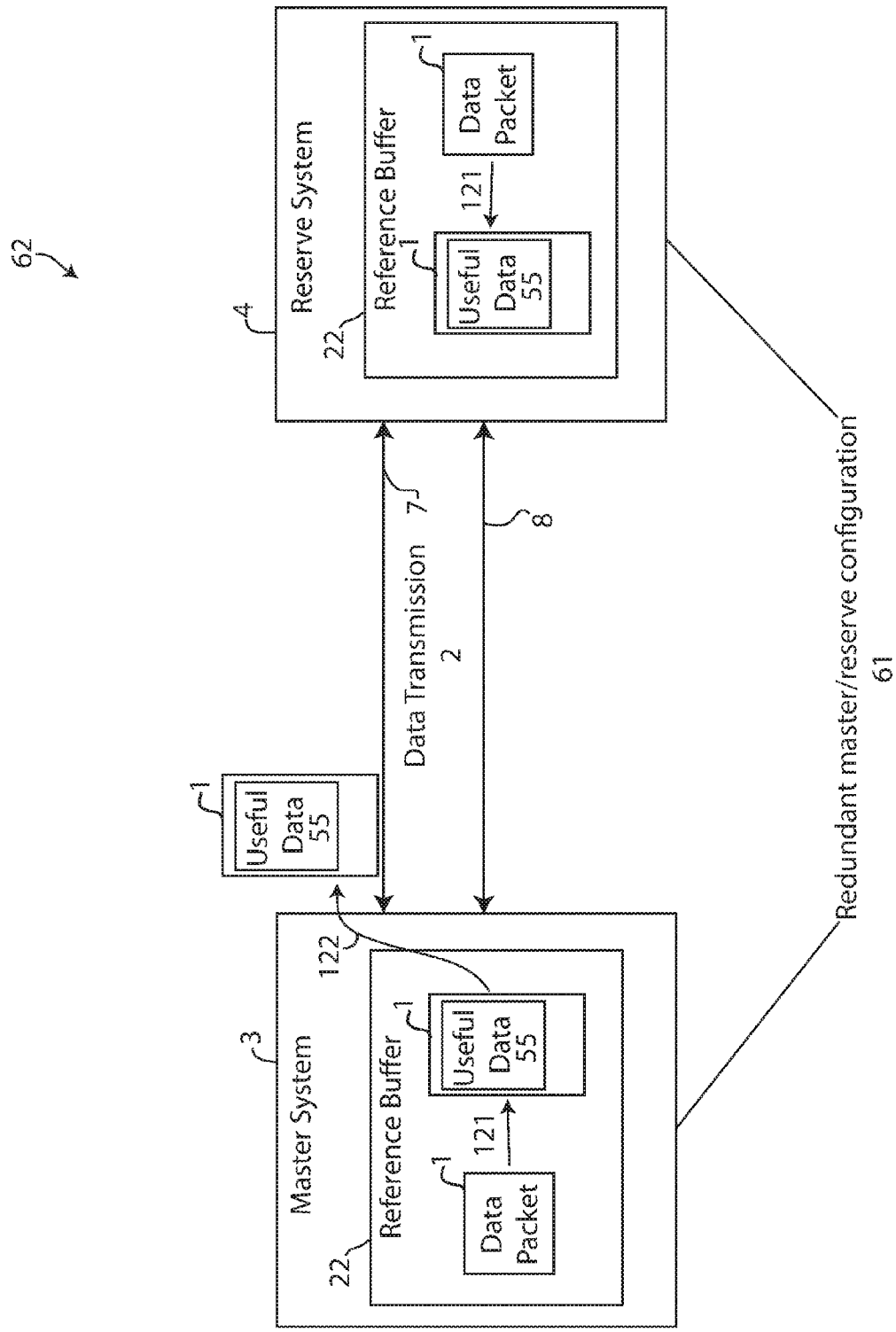
FIG. 1 shows a redundant master/reserve configuration in an automation system having two physical communication links between the master system and the reserve system.

FIG. 1 shows a redundant master/reserve configuration 61 in an automation system 62 having two physical communication links 7, 8 between two redundant systems, the master system 3, also just (first) communication subscriber/appliance or just master 3 for short, and the reserve system 4, also just (second) communication subscriber/appliance or just reserve 4 for short.

As FIG. 1 shows, the master system 3 is connected to the reserve system 4 by means of two redundant physical communication links 7, 8.

The two redundant communication links 7, 8 are used to interchange data—in the form of data packets 1—between the master 3 and the reserve 4 bidirectionally.

In such an automation system 62 with the redundant master/reserve configuration 61, the (current) master system 3 is typically the active communication partner and the (current) reserve system 4 is typically the initially passive communication partner, with data being interchanged between the master 3 and the reserve 4 typically once per automation cycle, subsequently just transfer 2.

In this case, there are usually substantially more data transmitted from the master 3 to the reserve 4 than in the opposite direction.

Redundant systems with time-critical tasks, such as the master/reserve system 3, 4 of the automation system 62 in the present case, require an efficient and deterministic communication mechanism 60 for the bidirectional interchange 2 of data between master 3 and reserve 4.

Figure 2:
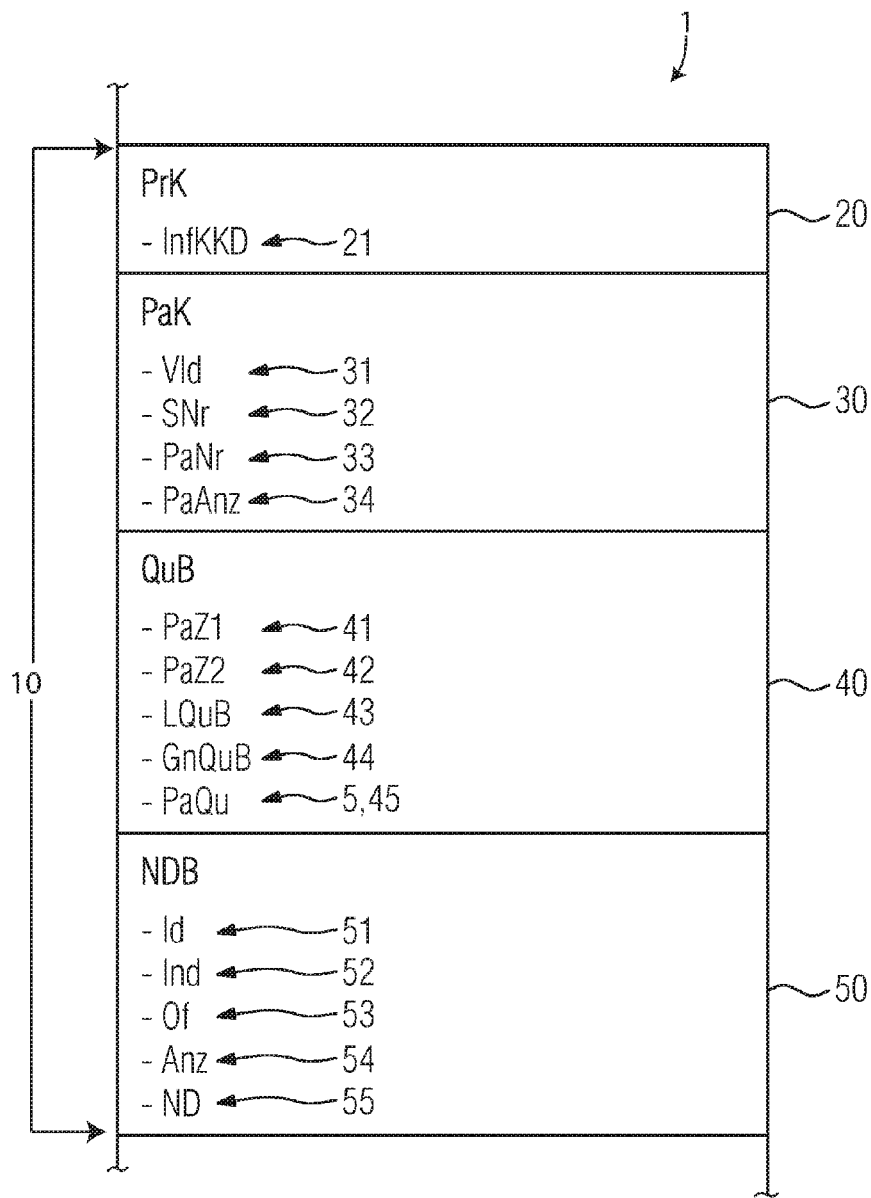
FIG. 2 shows a packet or data structure for a data packet for the data interchange in the case of the master/reserve configuration based on an exemplary embodiment.
Figure 3:
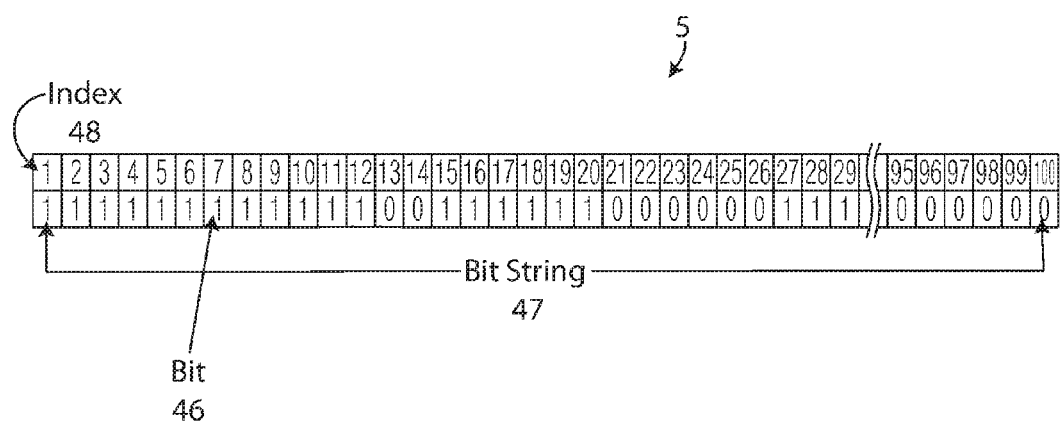
FIG. 3 shows a piece of acknowledgement information, coded in a bit string, in a data packet based on an exemplary embodiment.
Figure 4:
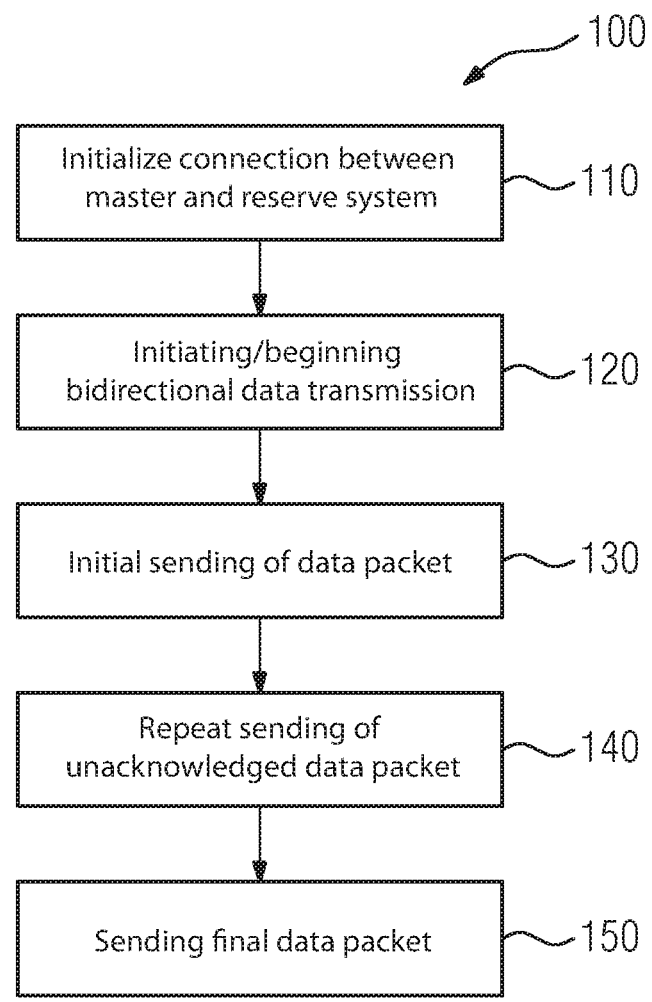
FIG. 4 shows method steps in a bidirectional data interchange in the case of the master/reserve configuration based on an exemplary embodiment (communication sequence).

FIG. 2, FIG. 3 and FIG. 4 illustrate such a required, efficient and deterministic communication mechanism 60 for the bidirectional interchange 2 of data between the master 3 and the reserve 4.

The communication mechanism 60 is based on a subordinate communication service that provides the transparent interchange of data packets having a fixed length, typically for communication in accordance with layer 2 (data link layer) of the OSI layers or OSI reference model.

Said subordinate communication service, or just the subordinate communication for short, provides a logical connection to data packets, including elementary error recognition or an elementary error correction mechanism (e.g. cyclic redundancy check CRC), and undertakes physical addressing of the data packets 1.

All tasks beyond these, such as acknowledgement, packet repetition, error recognition, redundancy management, etc., are undertaken by the communication mechanism 60.

An essential aspect of the communication mechanism 60 is that no separate acknowledgement messages—between the communication subscribers 3, 4—are required for the communication. Each data packet 1 transferred between the communication subscribers 3, 4 or the master 3 and the reserve 4 contains the acknowledgement status 5, 45 or the acknowledgement information 5, 45 about all data packets 1 already received by the respective communication subscriber 3, 4 (cf. FIG. 2 and FIG. 3).

The size of an individual message/data packet 1 is obtained from the subordinate communication service 9.

In each data packet 1, an area, an acknowledgement area 40, is reserved that can later be used to store the acknowledgement status 5, 45 or the acknowledgement information 5, 45 of the associated data packet 1—using all data packets 1 already received by the respective communication subscriber 3, 4. One bit 46 per data packet 1 is sufficient for this.

FIG. 2 shows the packet or data structure 10 of such a data packet 1 for the data interchange 2 in the case of the master/reserve configuration 61 on the basis of the communication mechanism 60.

As illustrated by FIG. 2, the essential areas that the data packet 1 comprises are: (1) a protocol header PrK 20, (2) a packet header PaK 30, (3) an acknowledgement area QuB 40 with the acknowledgement information 5, inter alia, and (4) a useful data area NDB 50.

(1) Protocol Header PrK 20

The protocol header 20 contains specific information based on the subordinate communication service 21, in this case Ethernet, for example, and is transparent for the communication protocol described.

(2) Packet Header PaK 30

As FIG. 2 shows, the packet header 30 contains the following components:

Connection Id VId for explicitly identifying the associated logical data connection 31.

Sequence No SNr for checking the consistency of the data transmission at successive transfers (user packet) 32.

Packet No PaNr identifies the current, transmitted data/message packet for the given sequence No 33.

Number of packets PaAnz specifies the number of data/message packets to be transferred in the current transfer 34.

(3) Acknowledgement Area QuB 40

As FIG. 2 shows, the acknowledgement area 40 contains the following components:

Reception counter PaZ1, PaZ2 per physical communication link 7, 8 (typically and in this case two 7, 8 (cf. FIG. 1), i.e. a first PaZ1 41 and a second reception counter PaZ2 42) 41, 42. Said reception counter 41, 42 is increased upon reception of a data packet 1 by a communication subscriber 3, 4 via the respective communication link 7, 8 and transferred back—with the current reception counter reading—to the other communication subscriber 3, 4.

Maximum length LQub 43 and currently used length GnQuB 44 of the subsequent area with the packet-specific acknowledgement information 5, 45.

The maximum length 43 is obtained from the maximum number of data packets; the used length 44 is obtained from the actual number of packets in the current transfer/user packet.

Acknowledgement information/acknowledgement status PaQu 5, 45. The acknowledgement status 5, 45 is formed by a bit string 47, the number of bits in which corresponds to the maximum number of data packets. Each bit 46 in the bit string 47 represents a specific data packet 1 (specific packet acknowledgement), with the implicit bit index 48 corresponding to the associated data packet number (cf. FIG. 3).

(4) Useful Data Area NDB 50

The useful data area 50 can, in principle, be structured without restriction.

It is merely necessary to ensure that the sending communication subscriber 3, 4 (transmission end) splits the data to be transmitted into the data packets 1 and the receiving communication subscriber 3, 4 (receiver end) correctly associates the transmitted data packets 1 and the information therein again.

Typically, this involves linearly addressed data, such as byte arrays, for example.

As FIG. 2 shows, the useful data area 50 contains the following components:

Id 51 for the useful data ND 55

Index Ind 52 for the useful data ND 55

Offset Of 53 for the useful data ND 55

Number of items of useful data ND 55

Useful data or packet data ND 55

The data packet structure (cf. FIG. 2 and FIG. 3) in the case of the communication mechanism 60 is optimized such that only a very small component of a data packet 1 is required for management data, in this case less than 1% per data packet 1.

Thus, for a packet length of 16 000 bytes, when Ethernet is used as subordinate communication service 9, the transmission of 1 MB of data requires, per direction, less than 30 bytes for the entire data protocol management, including the packet acknowledgements or the acknowledgement information 5, 45 and redundancy information, per packet (<0.2%).

From the number of packets and the transmission speed per data packet 1 or number of packets per unit time in the subordinate communication service 9, it is possible to ascertain the typical transfer time for the transfer 2 (user packet).

FIG. 3 illustrates the acknowledgement information 5, 45 coded in the bit string 47 in the case of a data packet 1 in the communication mechanism 60.

The bit string 47 shown comprises a succession of 100 bits 46, which means that it is possible to acknowledge a maximum of 100 individual specific data packets 1. The implicit bit index 48 of the bit string 47 corresponds to the associated data packet number of the data packet 1 to be acknowledged.

The binary digit "0" of a bit 46 thus represents "not received"/"not acknowledged"; the binary digit "1" of a bit 46 represents "received"/"acknowledged".

The acknowledgement information 5, 45 illustrated in FIG. 3 or the bit string 47 shown thus acknowledges the data packets 1-12, 15-20 and 27-29. Other data packets, e.g. data packet 13 and data packet 14, are not acknowledged by the bit string 47.

FIG. 4 illustrates the method sequence 100 or shows the method sequence 100 for the communication mechanism 60.

(1) Initialization and Connection Setup Between the Master System 3 and the Reserve System 4 in the Case of the Redundant Master/Reserve Configuration 61 for a Transfer 2 110

During initialization of the connection 110 between the master 3 and the reserve 4, the maximum permissible size of the user data per transfer 2, for example in this case an automation cycle, is initially prescribed or stipulated or determined.

From this, the respective number of required message/data packets 1—for a respective transmission direction 7, 8 (from the master 3 to the reserve 4 or vice-versa)—is ascertained that are required in order to hold the respective useful data that need to be transmitted in the respective transmission direction 7, 8 (from the master 3 to the reserve 4 or vice-versa).

During connection setup 110 between the master 3 and the reserve system 4, it is then stipulated which of the two communication subscribers 3, 4 acts in an active or initially passive manner.

Usually, the master system 3 will act in an active manner and a reserve system 4 will act in a passive manner.

Both the active 3 and the passive 4 communication subscriber prescribes a time limit for the transfer 2. Should the transfer 2 not have been carried out completely within this period of time, the logical connection is denoted as "failed" and an appropriate error message is returned.

(2) Initiation/Beginning of the Bidirectional Data Transmission 2 of Data Packets 1 by the Active Subscriber 3 with Formation 121 and Sending 122 of Data Packets 1 120

The active subscriber 3, in this case the master 3, for example, is responsible for the initiation 120 of the data transmission 2 or of the transfer 2, while the initially passive subscriber 4, in this case then the reserve 4, waits until a first data packet 1 arrives 4 from the active communication subscriber 3 or the master.

From this instant onward, both communication subscribers 3, 4, i.e. master 3 and reserve 4, send and receive data packets 1 (cf. FIG. 2 and FIG. 1)—on the basis of the communication mechanism 60—simultaneously.

(3) Simultaneous Data Interchange 2 of Data Packets 1 Between the Active and the Passive Subscriber 3, 4 with Formation 121 and Sending 122 of Data Packets 1 (Initial Sending) 130

In each data packet 1 to be formed 121 and to be sent 122 (cf. FIG. 2 and FIG. 3), the current status (acknowledgement information/status in the acknowledgement area) 5, 45 of the data packets 1 already received from the opposite party in the transfer 2 is entered (acknowledgement information/status, specific packet acknowledgements 5, 45, cf. FIG. 3).

Each data packet 1 that is sent therefore contains the complete acknowledgement status 5, 45 (cf. FIG. 3) of the data packets 1 already received from the opposite party. Both communication subscribers 3, 4 accordingly know at all times which data packets 1 have already been received in both (communication) directions 7, 8.

As soon as the initially passive communication subscriber 4, i.e. in this case the reserve 4, has received a first data packet 1 from the master 3 (cf. (2) initiation/beginning of the bidirectional data transmission 2 120), the reserve 4 also begins to transmit 2 its data that are intended for the active communication subscriber 3, i.e. the master 3.

The active communication subscriber 3 or the master 4 sends its data packets 1—in the case of the two redundant communication links 7, 8 (cf. FIG. 1)—initially alternately using both communication links 7, 8.

The passive communication subscriber 4 returns its data packets 1 using that communication link 7, 8 that it most recently used to receive data packets 1.

In addition, the active communication subscriber 3 is informed by means of the packet reception counters PaZ1 41, PaZ2 42 (cf. FIG. 2) associated with the communication links 7, 8 about which of the—in this case—two communication links 7, 8 has been used to receive data packets 1 (and in each case how many).

If the active communication subscriber 3 establishes—during the transfer 2—that no further data packets 1 have been received via one of the two redundant communication links 7, 8 ("faulty" communication link) (i.e. in this case the associated reception counter PaZ1 41, PaZ2 42 would no longer be increased), the other communication link 7, 8 is marked as what is known as the "preferred connection". Progressively more data packets 1 are then sent using said marked "preferred connection"—and correspondingly fewer data packets 1 using the other communication link. In graphic terms, the data transfer 2 shifts from the "faulty" communication link to the "preferred connection".

Should data packets 1 continue to be received only via the "preferred connection", the other communication link ("faulty" communication link) is ultimately marked as "failed" ("failed" communication link) and data packets 1 are exclusively transferred via the active communication link, i.e. the "preferred connection". Otherwise, both communication links 7, 8 are used on equal terms again.

As soon as one of the communication subscribers 3, 4, i.e. the master 3 or the reserve 4, recognizes from the acknowledgement information/status 5, 45 or from the "acknowledgement bits" 47 (cf. FIG. 3 and FIG. 2) that all data packets 1 in the transfer 2 that are to be transferred by said communication subscriber have been received by the other communication subscriber 3, 4, it reduces its transmission rate, since now only the acknowledgement data 5, 45 or reception counters 41, 42 (cf. FIG. 2) are relevant to the other communication subscribers 3, 4.

In order to ensure or increase the currentness of the transmitted data, the two communication subscribers 3, 4 each use what are known as "reference buffers" 22. Said "reference buffers" 22 ensure that data or the data packets 1 are "packed" 121 only when there is a respective data packet 1 pending transmission 122.

Thus, such a "reference buffer" 22—in this case particularly on the passive communication subscriber 4—can increase the currentness of the data sent from the passive 4 to the active 3 communication subscriber. The reason is that since the passive communication subscriber 4 initially waits until a first data packet 1 arrives from the active communication subscriber 3, certain data, e.g. a local system status, may already be outdated when the passive communication subscriber 4 begins its transmission process 122.

For this reason, instead of packing 121 the useful or user data 55 into data packets 1 completely before the actual transfer 2, the "reference buffer" 22 is specified for a data packet 1. In this case, the useful or user data 55 are then copied 121 into the associated data packets 1 not upon the actual transfer call 110 but rather only when the initially passive communication subscriber 4 has received the first data packet 1 from the active communication subscriber 3.

(4) Automatic Repeat Sending of Unacknowledged Data Packets 1 with Formation 121 and Sending 122 of Data Packets 1 140

Once all data packets 1 have been sent (off) 122, all as yet unacknowledged data packets 1 are resent, the communication mechanism 60 continuing to be used without alteration.

If both redundant communication links 7, 8 are available, the repeat sending 140 of unacknowledged data packets 1 always involves the respective other—in comparison with the initial sending 130 of said data packet 1—communication link 7, 8 being chosen for the "repeat data packet transfer" 140.

If the unacknowledged data packet 13 (index number 13, cf. FIG. 3) was sent using the first communication link 7 when first sent 130, for example, the other communication link 8 is chosen (if both are available) for the repeat sending 140 of said data packet 13.

As a result, the communication mechanism 60 ensures that, particularly when the number of data packets is small, the failure of one communication link 7, 8 does not result in a delay in the data transmission 2 or the transfers 2.

This automatic "repeat data packet transfer" 140 for unacknowledged data packets 1 implicitly results in communication faults or data packet losses being corrected if this is possible within the permissible time limit.

Since no separate acknowledgement messages are necessary or used in the case of the communication mechanism 60 either, there is also no need for special handling in the case of or for the loss of an acknowledgement message.

Fast "repeat data packet transfer" 140 of unacknowledged data packets 1 reduces the transfer time, particularly if a communication link 7, 8 fails during the transmission 2, but on the other hand increases the average number of packets transmitted.

For overall optimization of the bidirectional data transmission 2, sometimes unnecessary repetition of a few data packets is ultimately tolerated in the "both connections OK" case in order to avoid time delays in the "one connection failed" case.

For this purpose, the transfer times and data packet repetitions are measured and logged with different configurations in the specific system configuration 61 for the automation system 62.

(5) Sending of a Final Data Packet 23 and Conclusion/Termination of the Transfer 2 150

If the active communication subscriber 3 recognizes both that it has received—and acknowledged—all data packets 1 from the passive communication subscriber 4 and that its own data packets 1 have been completely acknowledged by the passive communication subscriber 4, it sends what is known as a "final" data packet 23 in order to communicate 150 the successful conclusion of the current transfer 2 (from the point of view of the user) to the passive communication subscriber 4.

However, the passive communication subscriber 4 terminates 150 the (current) transfer 2 with a successful status when all data packets 1 have, from its point of view, been sent and received successfully even when the "final" packet 23 from the active communication subscriber 3 has not been received by it after a prescribed period of time.

The "final" data packet 23 is always sent using both redundant communication links 7, 8 in order to reactivate a communication link 7, 8 that has been recognized as failed for further transfers 2.

This communication mechanism 60 therefore allows implicit error recognition in the case of redundant communication links 7, 8 with simultaneous optimization of the transfer 2 taking account of the currently available communication links 7, 8.

The total transfer time for the transfer 2—optimized by this communication mechanism 60—is no longer obtained for the communication mechanism 60 by adding two separate transfers between the master 3 and the reserve 4 (with one transfer per direction). It is essentially determined by the larger volume of data that is to be transmitted in one of the two directions between the master 3 and the reserve 4.

The optimum number of data packets 1 per unit time or the waiting time after a prescribed number of sent data packets 1 is dependent on the subordinate communication mechanism and can be configured or else adaptively customized on the basis of specific measurements.

Thus, as described, the communication mechanism 60 described advantageously results in short transfer times for the bidirectional data interchange by virtue of the simultaneous transfer of useful data and acknowledgement data in both communication directions, in optimized and efficient data interchange on account of separate acknowledgement messages not being necessary and parallel data transfer, in implicit redundancy handling in the case of communication links that are available multiple times, without additional expenditure on top, in optimum use of the available communication bandwidth for the useful data, in a high level of currentness for the transfer data and in simple implementation on account of the standard data packet structure.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for bi-directionally transmitting a data packet during data transmission between a first communication appliance and a second communication appliance comprising the steps of:
- forming the data packet to be transmitted from the first communication appliance to the second communication appliance, wherein the data packet contains packet data and a piece of acknowledgement information indicating an acknowledgement status of each data packet of a set of data packets already previously received by the first communication appliance during data packet transmission,
- transmitting the data packet formed from the first communication appliance to the second communication appliance, and
- re-transmitting an unacknowledged data packet using a different physical communication link than a physical communication link used for initially sending the unacknowledged data packet from the first communication appliance to the second communication appliance;
- wherein, when each data packet in the set of data packets from the data transmission have been received by the first communication appliance and the second communication appliance using a plurality of physical communication links, further transmitting a final data packet from the first communication appliance to the second communication appliance using all of said plurality of physical communication links concluding or terminating the data transmission.

2. The method for transmitting the data packet as claimed in claim 1, wherein the data packet being formed during the data transmission is a plurality of data packets and transmitting the plurality of data packets between the first communication appliance and the second communication appliance.

3. The method for transmitting the data packet as claimed in claim 1, wherein the piece of acknowledgement information is a bit string having a number of bits corresponding to a number of data packets in the set of data packets, wherein each bit of the number of bits represents a specific data packet and a binary digit of 0 for a bit in the bit string indicates the unacknowledged data packet.

4. The method for transmitting a data packet as claimed in claim 1, wherein the unacknowledged data packet is resent only after transmitting, for the first time, each data packet in the set of data packets from the data transmission.

5. The method for transmitting a data packet as claimed in claim 1, wherein a communication mechanism between the first communication appliance and second communication appliance is based on a subordinate communication service-providing interchange of each data packet in the set of data packets, having a fixed length, in accordance with a layer 2 of an OSI reference model.

* * * * *